(12) United States Patent
Moon et al.

(10) Patent No.: US 12,514,835 B2
(45) Date of Patent: Jan. 6, 2026

(54) GABA COMPLEX COMPOSITION

(71) Applicant: AMOREPACIFIC CORPORATION, Seoul (KR)

(72) Inventors: Changyong Moon, Yongin-si (KR); Su Hwan Kim, Yongin-si (KR); Jihae Lee, Yongin-si (KR); Kyoungmi Jung, Yongin-si (KR); Wonkyung Cho, Yongin-si (KR); Wanki Kim, Yongin-si (KR); Jong Hwa Roh, Yongin-si (KR); Chan Woong Park, Yongin-si (KR)

(73) Assignee: AMOREPACIFIC CORPORATION, Seoul (KR)

( * ) Notice: Subject to any disclaimer, the term of this patent is extended or adjusted under 35 U.S.C. 154(b) by 383 days.

(21) Appl. No.: 17/935,949

(22) Filed: Sep. 28, 2022

(65) Prior Publication Data

US 2023/0095813 A1 Mar. 30, 2023

(30) Foreign Application Priority Data

Sep. 29, 2021 (KR) ........................ 10-2021-0129080

(51) Int. Cl.
| | | |
|---|---|---|
| *A61K 31/197* | (2006.01) | |
| *A23L 33/15* | (2016.01) | |
| *A23L 33/175* | (2016.01) | |
| *A61K 9/00* | (2006.01) | |
| *A61K 9/14* | (2006.01) | |
| *A61K 9/16* | (2006.01) | |
| *A61K 9/20* | (2006.01) | |
| *A61K 9/48* | (2006.01) | |
| *A61K 31/198* | (2006.01) | |
| *A61K 31/455* | (2006.01) | |
| *A61P 25/00* | (2006.01) | |

(52) U.S. Cl.
CPC ............ *A61K 31/197* (2013.01); *A23L 33/15* (2016.08); *A23L 33/175* (2016.08); *A61K 9/0095* (2013.01); *A61K 9/145* (2013.01); *A61K 9/146* (2013.01); *A61K 9/1652* (2013.01); *A61K 9/2013* (2013.01); *A61K 9/2054* (2013.01); *A61K 9/2059* (2013.01); *A61K 9/485* (2013.01); *A61K 9/4858* (2013.01); *A61K 9/4866* (2013.01); *A61K 9/4875* (2013.01); *A61K 31/198* (2013.01); *A61K 31/455* (2013.01); *A61P 25/00* (2018.01); *A23V 2002/00* (2013.01)

(58) Field of Classification Search
CPC ........ A61P 25/00; A61P 25/26; A23L 33/135; A61K 31/197
See application file for complete search history.

(56) References Cited

U.S. PATENT DOCUMENTS

2017/0020919 A1* 1/2017 Theus .................... A61K 33/06
2020/0197378 A1 6/2020 Choi et al.

FOREIGN PATENT DOCUMENTS

KR 10-2019-0024593 A 3/2019

OTHER PUBLICATIONS

Prousky, Jonathan. (2014). Sedation, Relaxation, and Regulation: The Clinical Application of Gamma-aminobutyric acid, Niacin, and Melatonin for the Treatment of Insomnia. Journal of Orthomolecular Medicine. 29. 109-114. (Year: 2014).*
Boonstra Evert et al., (2015). Neurotransmitters as food supplements: the effects of GABA on brain and behavior. Frontiers in Psychology. 1664-1078. (Year: 2015).*
Jiang J, Gan Z, Li Y, Zhao W, Li H, Zheng J-P, et al. (2017) REM sleep deprivation induces endothelial dysfunction and hypertension in middle-aged rats: Roles of the eNOS/NO/cGMP pathway and supplementation with L-arginine. PLoS ONE 12(8): e0182746. https://doi.org/10.1371/journal.pone.0182746 (Year: 2017).*

* cited by examiner

*Primary Examiner* — Samantha L Shterengarts
(74) *Attorney, Agent, or Firm* — Rothwell, Figg, Ernst & Manbeck, P.C.

(57) ABSTRACT

The present disclosure relates to a composition for improving sleep quality, including γ-aminobutyric acid (GABA) or a salt, hydrate or solvate thereof; and at least one of arginine, niacin, and salts, hydrates and solvates thereof. The composition for improving sleep quality may improve the sleep quality by increasing melatonin secretion. In addition, in another aspect, the present disclosure provides a composition for alleviating stress, including γ-aminobutyric acid (GABA) or a salt, hydrate or solvate thereof; and at least one of arginine, niacin, and salts, hydrates and solvates thereof.

14 Claims, 4 Drawing Sheets

Comparative Example 6

Example 5

GABA COMPLEX COMPOSITION

CROSS REFERENCE TO RELATED APPLICATION

The present application claims priority to Korean Patent Application No. 10-2021-0129080, filed Sep. 29, 2021, the entire contents of which are hereby incorporated by reference.

FIELD OF THE INVENTION

The present specification relates to a composition for improving sleep quality.

BACKGROUND

Sleep is the most fundamental and essential physiological phenomenon, accounting for one third of human lifespan, and is very important for maintaining health and mental stability. Sleep is not only stopping physical and mental activities and taking a break, but also maintains health through intrinsic metabolic processes during sleep. During sleep, a people's heart rate decreases, meaning physical rest that alleviates the strain the heart during sleep. In addition, during sleep, the brain classifies and stores events that occurred during the day, and it is known that a learning effect is higher in a group that slept enough, and sufficient sleep is required for creative work.

However, despite these benefits of sleep, modern people are exposed to a lot of stress in a competitive society, and the number of people suffering from sleep disorders is rapidly increasing. To solve these sleep disorders, there are prescription drugs and non-prescription sleep inducers. Sleeping pills that require a prescription take effect immediately in a small amount, but there is a problem that the drug effect continues the next day and there are side effects of tolerance. On the other hand, sleep inducers made of food ingredients that do not require a prescription require a large amount of intake and have a less pronounced effect than sleeping pills. Thus, there is a need for the development of a composition excellent in the effect of improving the sleep quality, such as alleviation of sleep disorders without tolerance.

SUMMARY OF THE INVENTION

In one aspect, the present disclosure is to provide a composition for improving sleep quality.

In another aspect, the present disclosure is to provide a composition for alleviating stress.

In another aspect, the present disclosure is to provide a composition for suppressing daytime sleepiness.

In one aspect, the present disclosure provides a composition for improving sleep quality, including γ-aminobutyric acid (GABA) or a salt, hydrate or solvate thereof; and at least one of arginine, niacin, and salts, hydrates and solvates thereof.

In an exemplary embodiment, a weight ratio of the GABA or the salt, hydrate or solvate thereof; and the arginine or the salt, hydrate or solvate thereof may be 1:1.3 to 5.5.

In an exemplary embodiment, a weight of the GABA or the salt, hydrate or solvate thereof; and the niacin or the salt, hydrate or solvate thereof may be 1:1 to 3.

In an exemplary embodiment, a dosage of the GABA or the salt, hydrate or solvate thereof may be 1 to 2.5 mg/kg/day.

In an exemplary embodiment, the composition may be a food composition.

In an exemplary embodiment, the composition may be a pharmaceutical composition.

In another aspect, the present disclosure provides a composition for alleviating stress, including γ-aminobutyric acid (GABA) or a salt, hydrate or solvate thereof; and at least one of arginine, niacin, and salts, hydrates and solvates thereof.

In one aspect, the composition according to an embodiment of the present disclosure can improve the sleep quality by increasing melatonin secretion.

In one aspect, the composition according to an embodiment of the present disclosure can alleviate stress.

DETAILED DESCRIPTION

Figure 1:
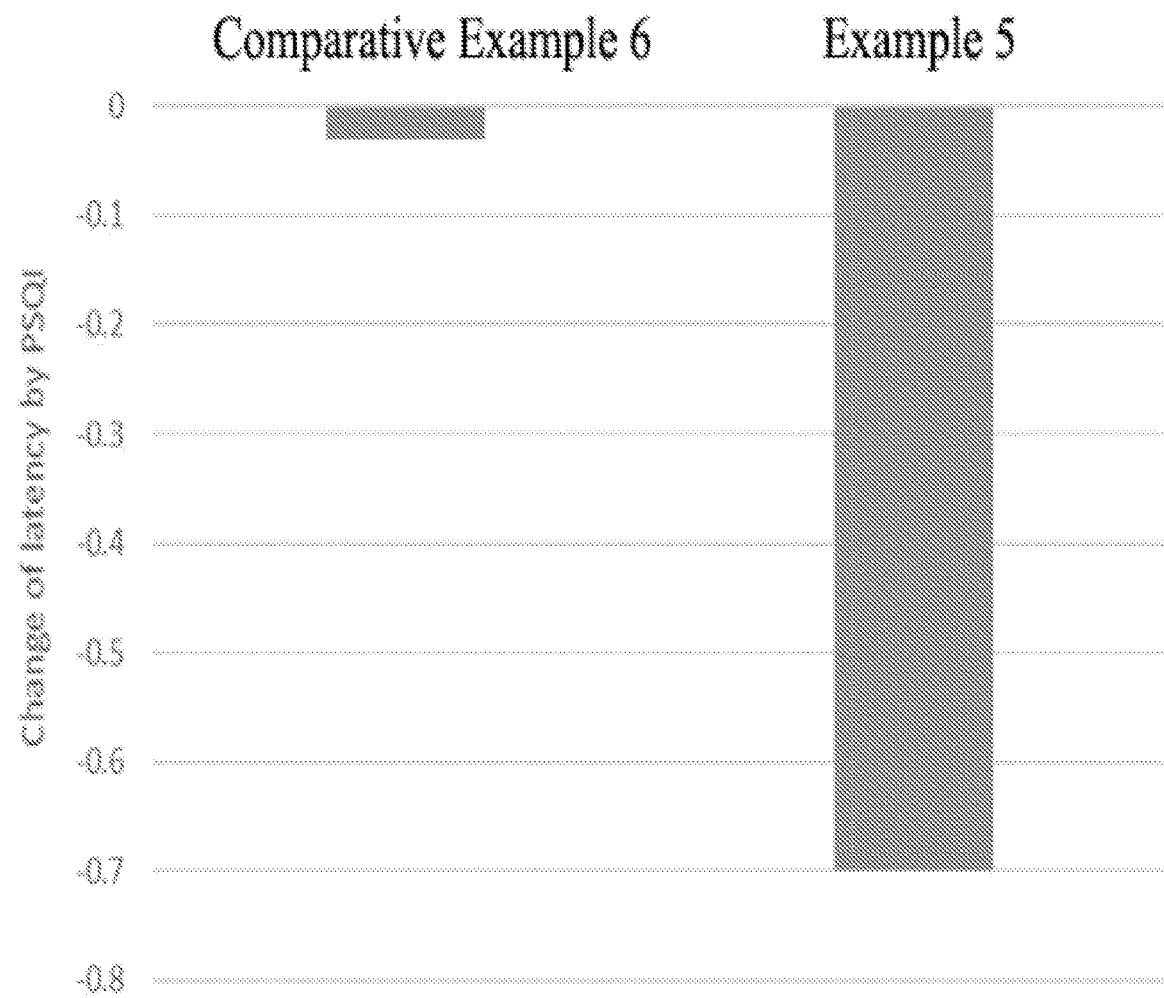
FIG. 1 is a graph showing the effect of improving the sleep latency of a composition according to an embodiment of the present disclosure.

Hereinafter, the present disclosure will be described in detail.

In one aspect, the present disclosure provides a composition for improving sleep quality, including γ-aminobutyric acid (GABA) or a salt, hydrate or solvate thereof; and at least one of arginine, niacin, and salts, hydrates and solvates thereof.

In one aspect, the present disclosure provides a composition for alleviating stress, including γ-aminobutyric acid (GABA) or a salt, hydrate or solvate thereof; and at least one of arginine, niacin, and salts, hydrates and solvates thereof.

In the present disclosure, the "salt" refers to a salt according to an aspect of the present disclosure which is acceptable in medications, cosmetics and foods and has the desired activity of the parent compound. The salt may include (1) an acid addition salt formed from an inorganic acid such as hydrochloric acid, hydrobromic acid, sulfuric acid, nitric acid, phosphoric acid, etc.; or an organic acid such as acetic acid, propionic acid, hexanoic acid, cyclopentylpropionic acid, glycolic acid, pyruvic acid, lactic acid, malonic acid, succinic acid, malic acid, maleic acid, fumaric acid, tartaric acid, citric acid, benzoic acid, 3-(4-hydroxybenzoyl)benzoic acid, cinnamic acid, mandelic acid, methanesulfonic acid, ethanesulfonic acid, 1,2-ethanedisulfonic acid, 2-hydroxyethanesulfonic acid, benzenesulfonic acid, 4-chlorobenzenesulfonic acid, 2-naphthalenesulfonic acid, 4-toluenesulfonic acid, camphorsulfonic acid, 4-methylbicylco[2,2,2]-oct-2-ene-1-carboxylic acid, glucoheptonic acid, 3-phenylpropionic acid, trimethylacetic acid, tert-butylacetic acid, lauryl sulfuric acid, gluconic acid, glutamic acid, hydroxynaphthoic acid, salicylic acid, stearic acid or muconic acid; or (2) a salt formed when an acidic proton present in the parent compound is substituted. In addition, the salt may be a pharmaceutically acceptable salt.

In the present disclosure, "pharmaceutically acceptable" means that use of a general medicinal dosage avoids a significant toxic effect and thus can be accepted or is accepted as appropriate for application to animals, particularly to human, by the government or a corresponding regulatory organization, or is listed in the pharmacopeia or regarded as being listed in general pharmacopeias.

In the present disclosure, the "hydrate" means a compound bonded to water and is used in a broad concept, including an inclusion compound in which water and the compound have no chemical bonding therebetween.

In the present disclosure, the "solvate" means a higher-order compound formed between a molecule or ion of a solute and a molecule or ion of a solvent.

γ-aminobutyric acid (GABA) is an inhibitory neurotransmitter that acts on the central nervous system, and in Korea, only a certain amount (e.g., 75 mg per day) is usually allowed to be ingested. Accordingly, it is desirable to improve the efficacy of GABA without increasing the intake of GABA.

In one embodiment, the weight ratio of GABA or a salt, hydrate or solvate thereof; and arginine or a salt, hydrate or solvate thereof may be 1:1.3 to 5.5. If the weight ratio of GABA or a salt, hydrate or solvate thereof; and arginine or a salt, hydrate or solvate thereof is out of the above range, sleep efficiency may be poor. Specifically, the weight ratio of GABA or a salt, hydrate or solvate thereof; and arginine or a salt, hydrate or solvate thereof may be 1:1.3 to 5.5, 1:1.3 to 5, 1:1.5 to 5, 1:1.5 to 4.5, 1:2 to 4.5, 1:2 to 4, or 1:2 to 3.5.

In one embodiment, the weight ratio of GABA or a salt, hydrate or solvate thereof; and niacin or a salt, hydrate or solvate thereof may be 1:1 to 3. If the weight ratio of GABA or a salt, hydrate or solvate thereof; and niacin or a salt, hydrate or solvate thereof is out of the above range, the effect of improving sleep quality may be poor. Specifically, the weight ratio of GABA or a salt, hydrate or solvate thereof; and niacin or a salt, hydrate or solvate thereof may be 1:1 to 3, 1:1.3 to 3, 1:1.3 to 2.5, 1:1.5 to 2.5, or 1:2.

In one embodiment, the GABA or the salt, hydrate or solvate thereof may be administered in a dosage of 1 to 2.5 mg/kg/day. If the dosage of the GABA or the salt, hydrate or solvate thereof is less than 1 mg/kg/day, the effect according to the present disclosure is reduced. Specifically, the GABA or the salt, hydrate or solvate thereof may be administered in a dosage of is 1 mg/kg/day or more, 1.1 mg/kg/day or more, or 1.2 mg/kg/day or more; but 2.5 mg/kg/day or less, 2.4 mg/kg/day or less, 2.3 mg/kg/day or less, 2.2 mg/kg/day or less, 2.1 mg/kg/day or less, or 2 mg/kg/day or less.

In one embodiment, the content of the GABA or the salt, hydrate or solvate thereof may be 1 to 20 wt % based on the total weight of the composition. If the content of the GABA or the salt, hydrate or solvate thereof is less than 1 wt % based on the total weight of the composition, the effect according to the present disclosure is reduced. Specifically, the content of the GABA or the salt, hydrate or solvate thereof may be 1 wt % or more, 1.5 wt % or more, 2 wt % or more, 2.5 wt % or more, 3 wt % or more, 3.5 wt % or more, 4 wt % or more, 4.5 wt % or more, 5 wt % or more, 5.5 wt % or more, 6 wt % or more, 6.5 wt % or more, 7 wt % or more, 7.5 wt % or more, or 8 wt % or more; but 20 wt % or less, 19.5 wt % or less, 19 wt % or less, 18.5 wt % or less, 18 wt % or less, 17.5 wt % or less, 17 wt % or less, 16.5 wt % or less, 16 wt % or less, 15.5 wt % or less, or 15 wt % or less, based on the total weight of the composition.

In one embodiment, the content of the arginine or the salt, hydrate or solvate thereof may be 8 to 35 wt % based on the total weight of the composition. If the content of the arginine or the salt, hydrate or solvate thereof is out of the above range, sleep efficiency may be reduced. Specifically, the content of the arginine or the salt, hydrate or solvate thereof is 8 wt % or more, 8.1 wt % or more, 8.2 wt % or more, 8.3 wt % or more, 8.4 wt % or more, 8.5 wt % or more, 9 wt % or more, 9.5 wt % or more, 10 wt % or more, 10.5 wt % or more, 11 wt % or more, 11.5 wt % or more, 12 wt % or more, 12.5 wt % or more, 13 wt % or more, 13.5 wt % or more, 14 wt % or more, 14.5 wt % or more, or 15 wt % or more; but 35 wt % or less, 34.9 wt % or less, 34.8 wt % or less, 34.7 wt % or less, 34.6 wt % or less, 34.5 wt % or less, 34 wt % or less, 33.5 wt % or less, 33 wt % or less, 32.5 wt % or less, 32 wt % or less, 31.5 wt % or less, 31 wt % or less, 30.5 wt % or less, or 30 wt % or less, based on the total weight of the composition.

In one embodiment, the content of the niacin or the salt, hydrate or solvate thereof may be 4 to 20 wt % based on the total weight of the composition. If the content of the niacin or the salt, hydrate or solvate thereof is out of the above range, sleep efficiency may be reduced. Specifically, the content of the niacin or the salt, hydrate or solvate thereof is 4 wt % or more, 4.1 wt % or more, 4.2 wt % or more, 4.3 wt % or more, 4.4 wt % or more, 4.5 wt % or more, 5 wt % or more, 5.5 wt % or more, 6 wt % or more, 6.5 wt % or more, 7 wt % or more, 7.5 wt % or more, 8 wt % or more, 8.5 wt % or more, 9 wt % or more, 9.5 wt % or more, or 10 wt % or more; but 20 wt % or less, 19.9 wt % or less, 19.8 wt % or less, 19.7 wt % or less, 19.6 wt % or less, 19.5 wt % or less, 19 wt % or less, 18.5 wt % or less, 18 wt % or less, 17.5 wt % or less, 17 wt % or less, 16.5 wt % or less, 16 wt % or less, 15.5 wt % or less, or 15 wt % or less, based on the total weight of the composition.

In one embodiment, the GABA may be L-sodium glutamate fermented by lactic acid bacteria. The lactic acid bacteria may be *Lactobacillus brevis*.

In one embodiment, the composition according to an embodiment of the present disclosure may suppress daytime sleepiness.

In an embodiment, the composition may be a food composition. The food composition may be formulated into, for example, a tablet, a granule, a pill, a powder, a liquid such as a drink, a caramel, a gel, a bar, a tea bag, etc., although not being specially limited thereto. Each formulation may contain ingredients commonly used in the art that may be selected by those skilled in the art without difficulty depending on the type of the formulation, purpose of use, etc. in addition to the active ingredient. A synergistic effect may be achieved with the active ingredient is used together with other ingredients.

In an embodiment, the food composition may contain various nutrients, vitamins, minerals (electrolytes), flavorants such as synthetic flavorants or natural flavorants, colorants, extenders (cheese, chocolate, etc.), pectic acid and its salts, alginic acid and its salts, organic acids, protective colloidal thickeners, pH control agents, stabilizer, antiseptic, glycerin, alcohols, carbonating agents used in carbonated beverages, etc. In addition, the food composition according to an embodiment may further contain a pulp for preparation of a natural fruit juice, a fruit juice beverage or a vegetable beverage. These ingredients may be used either alone or in combination. The content of these additives is of no great importance. In general, they are contained within a range of about 0 to 50 parts by weight based on 100 parts by weight of the composition according to an embodiment.

In an embodiment, the composition may be a pharmaceutical composition. The pharmaceutical composition may be a composition for preventing or treating sleep disorders. The pharmaceutical composition may be administered orally, parenterally, rectally, topically, transdermally, intravenously, intramuscularly, intraperitoneally, subcutaneously, etc. Formulations for oral administration may include a tablet, a pill, a soft or hard capsule, a granule, a powder, a fine granule, a liquid, an emulsion or a pellet, although not being limited thereto. Formulations for parenteral administration may include a solution, a suspension, an emulsion, a gel, an injection, a medicinal drip, a suppository, a patch or a spray, although not being limited thereto. The formulations may be prepared easily by common methods in the art and may further contain a surfactant, an excipient, a wetting agent, an emulsification accelerator, a suspending agent, a salt or a buffer for control of osmotic pressure, a colorant, a flavor, a stabilizer, an antiseptic, a preservative or other commonly used adjuvants.

In one aspect, the present disclosure provides a method for improving sleep quality, including the step of administering an effective amount of a composition including γ-aminobutyric acid (GABA) or a salt, hydrate or solvate thereof; and at least one of arginine, niacin, and salts, hydrates and solvates thereof to a subject in need of sleep quality improvement. In one aspect, the administration of the method may be performed according to the administration method and administration dose described in the present disclosure.

In one aspect, the present disclosure provides a method for alleviating stress, including the step of administering an effective amount of a composition including γ-aminobutyric acid (GABA) or a salt, hydrate or solvate thereof; and at least one of arginine, niacin, and salts, hydrates and solvates thereof to a subject in need of stress alleviation. In one aspect, the administration of the method may be performed according to the administration method and administration dose described in the present disclosure.

Hereinafter, the present disclosure will be described in detail through examples, etc. However, the following examples are for illustrative purposes only and it will be obvious to those having ordinary skill in the art that the scope of the present disclosure is not limited by the examples.

[Experimental Example 1] Measurement of Changes in Melatonin and Cortisol

Tablets of Examples 1 to 5 and Comparative Examples 1 to 10 were prepared with the compositions shown in Tables 1 and 2 below (unit: mg).

TABLE 1

|  | Example 1 | Example 2 | Example 3 | Example 4 | Example 5 |
|---|---|---|---|---|---|
| GABA(γ-aminobutyric acid) | 75 | 75 | 75 | 75 | 75 |
| Niacin | 75 | 75 | 150 | 150 | 90 |
| Arginine | 100 | 400 | 100 | 400 | 250 |
| Crystalline cellulose | 500 | 500 | 500 | 500 | 500 |
| Corn starch | 175 | 175 | 175 | 175 | 175 |
| Magnesium Stearate | 7.5 | 7.5 | 7.5 | 7.5 | 7.5 |

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| GABA(γ-aminobutyric acid) | — | — | 75 | 75 | 75 | — | 75 | 150 | 75 | 75 |
| Niacin | 150 | — | — | — | — | — | — | — | 175 | — |
| Arginine | — | 400 | — | — | — | — | — | — | — | 175 |
| Theanine | — | — | 200 | — | 200 | — | — | — | — | — |
| Tryptophan | — | — | — | 200 | 200 | — | — | — | — | — |
| Crystalline cellulose | 500 | 500 | 500 | 500 | 500 | 500 | 500 | 500 | 500 | 500 |
| Corn starch | 175 | 175 | 175 | 175 | 175 | 175 | 175 | 175 | 175 | 175 |
| Magnesium Stearate | 7.5 | 7.5 | 7.5 | 7.5 | 7.5 | 7.5 | 7.5 | 7.5 | 7.5 | 7.5 |

Forty adults in their 30s and 40s (17 males, 23 females) were instructed to take 1 tablet of Examples 1 to 5 and Comparative Examples 1 to 10 once daily for a week. Then, for each subject, 0.5 g of saliva was collected between 7 and 8 in the morning to measure the amount of cortisol, and 0.5 g of saliva was collected between 10 and 11 at night to measure the amount of melatonin. Tables 3 and 4 showed the change (%) of the measured value after ingestion based on the measured value before ingestion.

TABLE 3

|  | Example 1 | Example 2 | Example 3 | Example 4 | Example 5 |
|---|---|---|---|---|---|
| Change in melatonin (%) | 332 | 340 | 345 | 353 | 351 |
| Change in cortisol(%) | 443 | 456 | 459 | 463 | 461 |

TABLE 4

|  | Comp. Ex. 1 | Comp. Ex. 2 | Comp. Ex. 3 | Comp. Ex. 4 | Comp. Ex. 5 | Comp. Ex. 6 | Comp. Ex. 7 | Comp. Ex. 8 | Comp. Ex. 9 | Comp. Ex. 10 |
|---|---|---|---|---|---|---|---|---|---|---|
| Change in melatonin (%) | 105 | 103 | 258 | 254 | 261 | 105 | 224 | 282 | 263 | 274 |
| Changes in cortisol(%) | 103 | 107 | 369 | 367 | 371 | 98 | 331 | 393 | 371 | 386 |

[Experimental Example 2] Sleep Quality Evaluation 20 adults in their 30s and 50s (10 males, 10 females) who usually have trouble sleeping were divided into two groups of 10 people each. One group was allowed to ingest 1 tablet of Example 5 of Experimental Example 1 once a day for a week, and the other group was allowed to ingest 1 tablet of Comparative Example 6 of Experimental Example 1 once a day for a week. Thereafter, the subjects were subjected to a Pittsburgh Sleep Quality Index (PSQI) evaluation to measure the sleep latency and sleep efficiency, and the results were shown in FIGS. 1 and 2, respectively.

Figure 2:
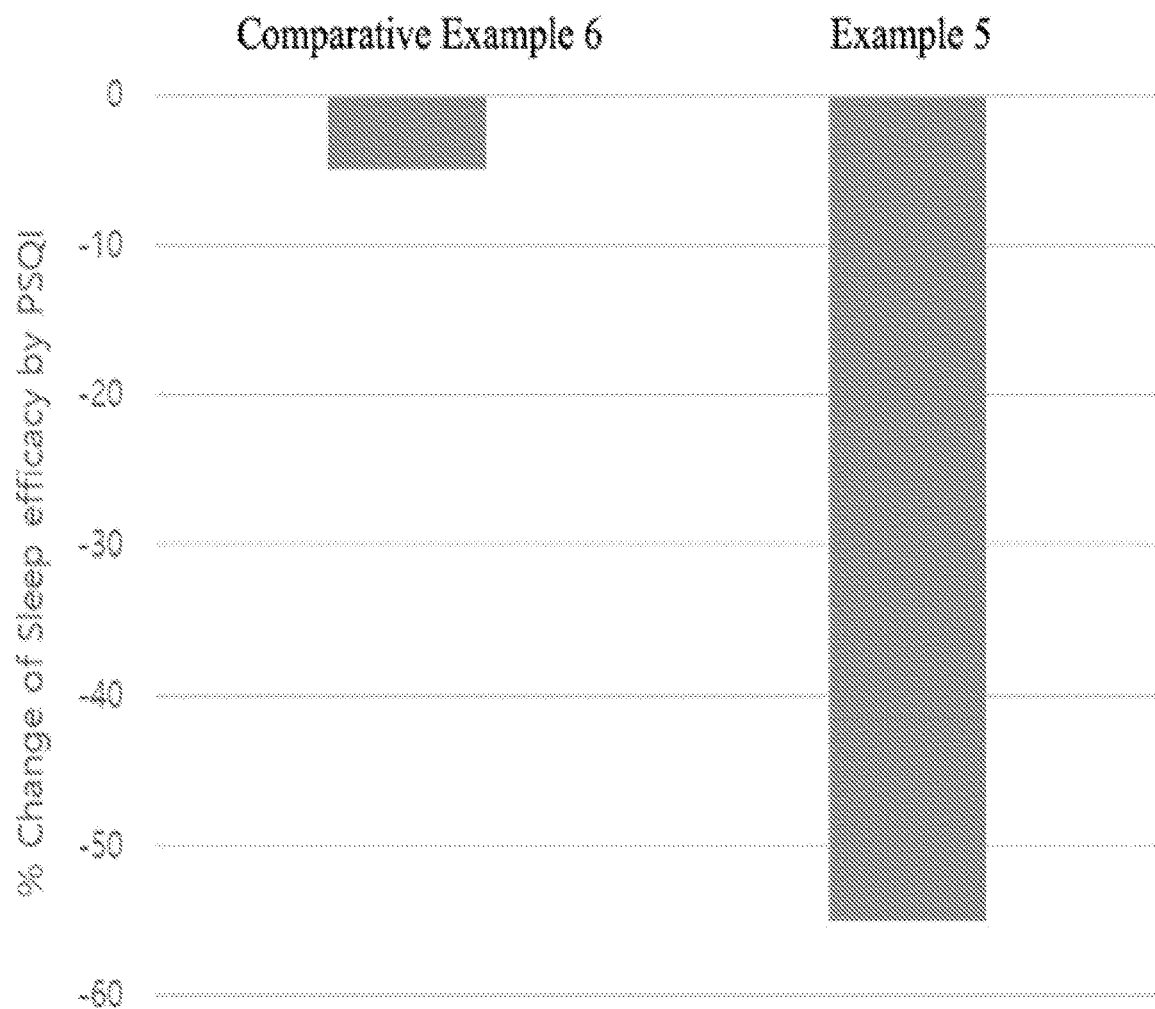
FIG. 2 is a graph showing the improved sleep efficiency of a composition according to an embodiment of the present disclosure.

As shown in FIG. 1, compared with the group ingesting Comparative Example 6, it was confirmed that the sleep latency was improved by more than 20 times in the group ingesting Example 5. In addition, as shown in FIG. 2, regarding the sleep efficiency, it was confirmed that the group ingesting Example 5 improved by about 10 times or more compared to the group ingesting Comparative Example 6.

[Experimental Example 3] Fatigue Severity Evaluation 20 adults (10 males, 10 females) in their 30s and 50s who usually feel fatigue were divided into two groups of 10 each. One group was allowed to ingest 1 tablet of Example 5 of Experimental Example 1 once a day for a week, and the other group was allowed to ingest 1 tablet of Comparative Example 6 of Experimental Example 1 once a day for a week. Fatigue Severity Scale (FSS) survey was conducted on the subjects before and after ingestion. The FSS is a questionnaire evaluation conducted on 9 items related to fatigue, and the lowest score of 1 point and the highest of 7 points were selected and evaluated for low motivation, fatigue after exercise, easily tiredness, difficulty in physical activity, difficulty in continuous physical activity, and fatigue-related problems. The results of the FSS before and after ingestion evaluated as described above were shown in FIG. 3.

Figure 3:
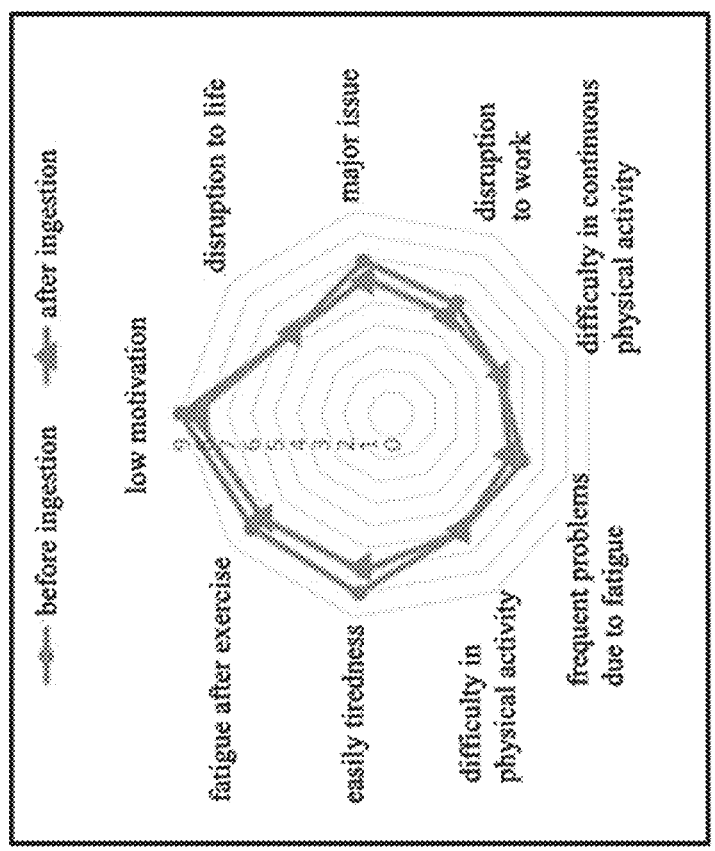
FIG. 3 is a graph showing the reduced fatigue severity of a composition according to an embodiment of the present disclosure.
Figure 3:
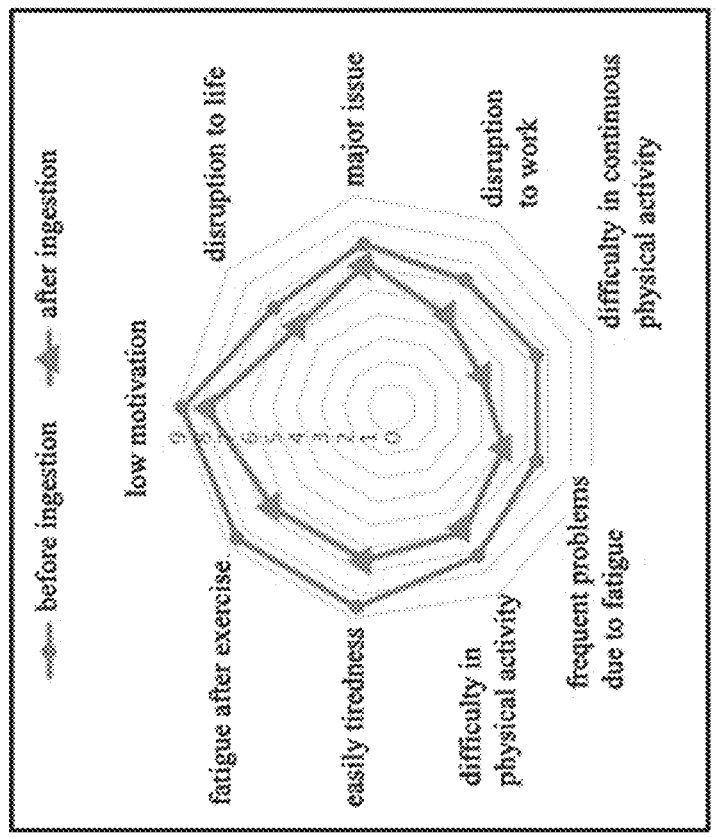

As shown in FIG. 3, it was confirmed that the fatigue severity was reduced in the group taking Example 5 as compared to the group taking Comparative Example 6.

[Experimental Example 4] Daytime Sleepiness Scale Evaluation 20 adults in their 30s and 50s (10 males, 10 females) who usually feel drowsy during the day were divided into two groups of 10 people each. One group was allowed to ingest 1 tablet of Example 5 of Experimental Example 1 once a day for a week, and the other group was allowed to ingest 1 tablet of Comparative Example 6 of Experimental Example 1 once a day for a week. The subjects were subjected to an Epworth sleepiness scale (ESS) survey before and after ingestion. The ESS is a survey evaluation conducted on 8 items of situations that can make the subject feel drowsy in daily life, and the lowest score of 0 point and the highest of 3 points were selected and evaluated for the situations such as sitting and reading a book, watching TV, sitting still after lunch, being in a car stopped due to traffic congestion, etc. The ESS survey results before and after ingestion evaluated as described above were shown in FIG. 4.

Figure 4:
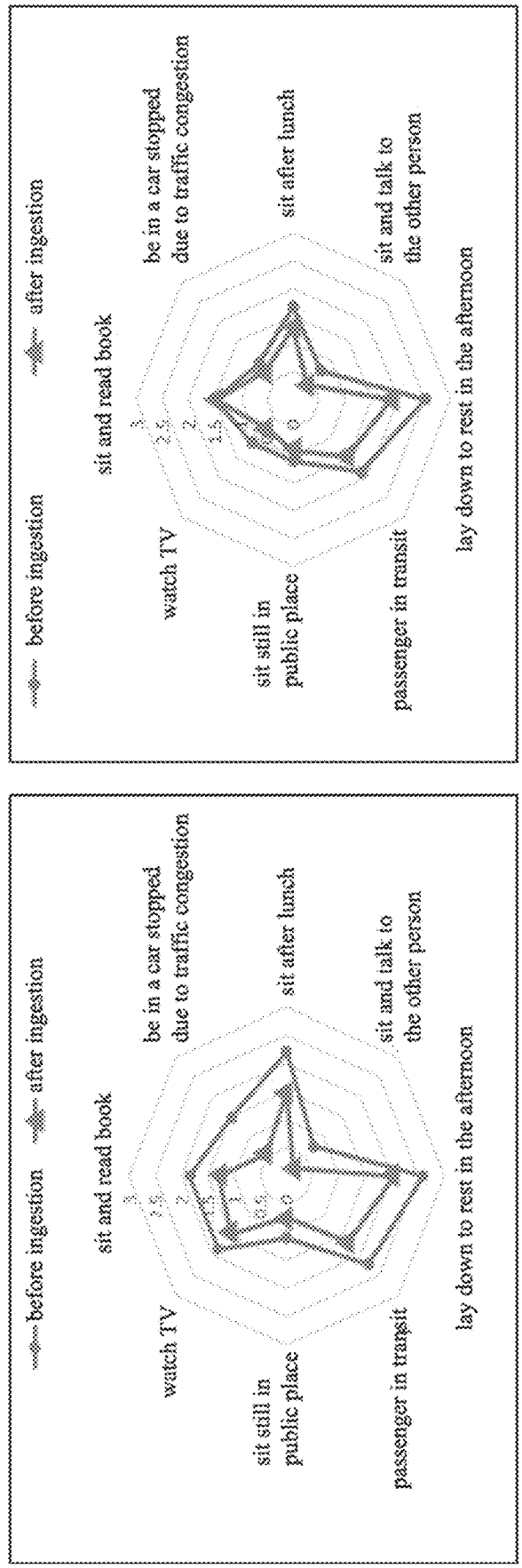
FIG. 4 is a graph showing the effect of alleviating daytime sleepiness of a composition according to an embodiment of the present disclosure.

As shown in FIG. 4, it was confirmed that the degree of daytime sleepiness was improved in the group taking Example 5 as compared to the group taking Comparative Example 6.

[Experimental Example 5] Stress Alleviation Evaluation 20 adults (10 males, 10 females) were divided into two groups of 10 people each. One group was allowed to ingest 1 tablet of Example 5 of Experimental Example 1 once a day for a week, and the other group was allowed to ingest 1 tablet of Comparative Example 6 of Experimental Example 1 once a day for a week. The profiles of mood states (POMS) of the subjects were surveyed, and the change (%) of the score after ingestion based on the score before ingestion was shown in Table 5 below. Specifically, the POMS survey is a self-report scale composed of 6 subscales that evaluates mood states on five levels ranging from 0 to 4. The six factors are a tension-anxiety (T) factor, a depression-dejection (D) factor, an anger-hostility (A) factor, a vigor-activity (V) factor, a fatigue-inertia (F) factor, and a confusion-bewilderment (C) factor.

TABLE 5

| Factors | Example 5 | Comparative Example 6 |
| --- | --- | --- |
| T (Tension-Anxiety) | 95.4 | 98.5 |
| D (Depression-Dejection) | 95.4 | 97.7 |
| A (Anger-Hostility) | 97.3 | 103.6 |
| V (Vogor-Activity) | 110.2 | 101.1 |

As shown in Table 5, compared to the group ingesting Comparative Example 6, the scores for T, D, and A factors decreased more and the score for V factor increased in the group ingested Example 5 after ingestion, which confirmed that the stress was alleviated.

[Formulation Example 1] Tablet 75 mg of GABA (γ-aminobutyric acid), 250 mg of arginine, 90 mg of niacin, and 75 mg of corn starch were mixed and granulated using a fluid bed granulator. Then, 300 mg of crystalline cellulose and 7.5 mg of magnesium stearate were added to prepare tablets with a tableting machine.

[Formulation Example 2] Soft Capsule 75 mg of GABA (γ-aminobutyric acid), 250 mg of arginine, 90 mg of niacin, 220 mg of soybean oil, 2 mg of palm oil, 8 mg of hydrogenated vegetable oil, 4 mg of yellow wax, and 6 mg of lecithin were mixed and filled one capsule according to a commonly employed method to prepare a soft capsule.

[Formulation Example 3] Hard Capsule 75 mg of GABA (γ-aminobutyric acid), 250 mg of arginine, 90 mg of niacin, and 75 mg of corn starch were mixed and granulated using a fluidized bed granulator, and then 2.5 mg of silicon dioxide and 5 mg of magnesium stearate were mixed with the granules and then the mixture was filled one capsule according to a commonly employed method to prepare a hard capsule.

[Formulation Example 4] Powder 75 mg of GABA (γ-aminobutyric acid) g, 100 mg of arginine, 150 mg of niacin, 500 mg of lactose and 500 mg of corn starch were mixed and filled an airtight bag to prepare powder.

[Formulation Example 5] Granule 75 mg of GABA (γ-aminobutyric acid), 250 mg of arginine, 150 mg of niacin, 250 mg of anhydrous crystalline glucose, and 550 mg of starch were mixed and granulated using a fluidized bed granulator, and then filled a bag to prepare granules.

[Formulation Example 6] Liquid 75 mg of GABA (γ-aminobutyric acid), 100 mg of arginine, 150 mg of niacin, 10 g of glucose, 0.6 g of citric acid, and 15 g of liquid oligosaccharide were mixed, and then 175 ml of purified water was added to the mixture. After filling each bottle with 200 ml of the mixture, the bottle was sterilized at 130° C. for 4 to 5 seconds to prepare a drink beverage.

What is claimed is:

1. A method for improving sleep quality without administering melatonin, comprising the step of administering an effective amount of a composition comprising T-aminobutyric acid (GABA) or a salt, hydrate or solvate thereof; arginine or a salt, hydrate, or solvate thereof; and niacin or a salt, hydrate, or solvate thereof to a human subject in need of sleep quality improvement without administering melatonin to the human subject,
    wherein a dosage of 1 to 2.5 mg/kg/day of the GABA or the salt, hydrate or solvate thereof is administered in the composition,
    wherein a weight of the GABA or the salt, hydrate or solvate thereof; to the niacin or the salt, hydrate or solvate thereof is 1:1 to 3 in the composition, and
    wherein a weight ratio of the GABA or the salt, hydrate or solvate thereof; to the arginine or the salt, hydrate or solvate thereof is 1:1.3 to 5.5 in the composition.

2. The method according to claim 1, wherein the composition is a food composition.

3. The method according to claim 1, wherein the composition is a pharmaceutical composition.

4. A method for alleviating stress without administering melatonin, comprising the step of administering an effective amount of a composition comprising γ-aminobutyric acid (GABA) or a salt, hydrate or solvate thereof; arginine or a salt, hydrate, or solvate thereof; and niacin or a salt, hydrate, or solvate thereof to a human subject in need of stress alleviation without administering melatonin to the human subject,
    wherein a dosage of 1 to 2.5 mg/kg/day of the GABA or the salt, hydrate or solvate thereof is administered in the composition,
    wherein a weight of the GABA or the salt, hydrate or solvate thereof; to the niacin or the salt, hydrate or solvate thereof is 1:1 to 3 in the composition, and
    wherein a weight ratio of the GABA or the salt, hydrate or solvate thereof; to the arginine or the salt, hydrate or solvate thereof is 1:1.3 to 5.5 in the composition.

5. The method according to claim 4, wherein the composition is a food composition.

6. The method according to claim 4, wherein the composition is a pharmaceutical composition.

7. The method of claim 1, wherein the composition comprises 4 to 20 wt % of the niacin or salt, hydrate, or solvate thereof.

8. The method of claim 1, wherein the composition comprises 8 to 35 wt % of the arginine or salt, hydrate, or solvate thereof.

9. The method of claim 1, wherein the composition comprises 1 to 20 wt % of the GABA or salt, hydrate, or solvate thereof.

10. The method of claim 1, wherein the composition comprises:
    i) 4 to 20 wt % of the niacin or salt, hydrate, or solvate thereof;
    ii) 8 to 35 wt % of the arginine or salt, hydrate, or solvate thereof; and
    iii) 1 to 20 wt % of the GABA or salt, hydrate, or solvate thereof.

11. The method of claim 1, wherein the composition comprises 75 mg of the GABA or salt, hydrate, or solvate thereof.

12. The method of claim 1, wherein the compositing comprises 75-150 mg of the niacin or salt, hydrate, or solvate thereof.

13. The method of claim 1, wherein the compositing comprises 100-400 mg of the arginine or salt, hydrate, or solvate thereof.

14. The method of claim 1, wherein the composition comprises:
    i) 75 mg of the GABA or salt, hydrate, or solvate thereof;
    ii) 75-150 mg of the niacin or salt, hydrate, or solvate thereof; and
    iii) 100-400 mg of the arginine or salt, hydrate, or solvate thereof.

* * * * *